(12) United States Patent
May et al.

(10) Patent No.: US 6,790,554 B2
(45) Date of Patent: Sep. 14, 2004

(54) FUEL CELLS AND FUEL CELL PLATES

(75) Inventors: Barrett May, Cheshire (GB); David R Hodgson, Bolton (GB)

(73) Assignee: Imperial Chemical Industries PLC, London (GB)

( * ) Notice: Subject to any disclaimer, the term of this patent is extended or adjusted under 35 U.S.C. 154(b) by 129 days.

(21) Appl. No.: 09/805,145

(22) Filed: Mar. 14, 2001

(65) Prior Publication Data

US 2001/0021470 A1 Sep. 13, 2001

Related U.S. Application Data

(63) Continuation of application No. PCT/GB99/03206, filed on Sep. 27, 1999.
(60) Provisional application No. 60/190,929, filed on Mar. 27, 2000.

(30) Foreign Application Priority Data

Oct. 8, 1998 (GB) ............................................. 9821856
Mar. 15, 2000 (GB) ............................................. 0006125

(51) Int. Cl.[7] .......................... H01M 8/02; H01M 8/24; B32B 15/04
(52) U.S. Cl. ............................. 429/34; 429/30; 429/37; 428/472
(58) Field of Search ............................. 429/30, 34, 37, 429/38, 59, 44; 428/472

(56) References Cited

U.S. PATENT DOCUMENTS

| | | | |
|---|---|---|---|
| 3,134,696 A | 5/1964 | Douglas et al. | 136/86 |
| 3,589,942 A | 6/1971 | Leitz, Jr. et al. | 136/86 |
| 3,607,416 A * | 9/1971 | Sizer et al. | 429/34 |
| 4,000,346 A * | 12/1976 | Dowell | 428/702 X |
| 4,214,969 A | 7/1980 | Lawrance | 204/255 |
| 5,064,734 A | 11/1991 | Nazmy | 429/33 |
| 5,635,039 A | 6/1997 | Cisar et al. | 204/252 |
| 5,804,328 A | 9/1998 | Odegard et al. | 429/32 |
| 5,840,414 A * | 11/1998 | Bett et al. | 429/34 X |
| 5,840,438 A * | 11/1998 | Johnson et al. | 429/38 X |
| 5,846,668 A | 12/1998 | Watanabe | 429/32 |
| 5,912,088 A | 6/1999 | Ernst | 429/34 |
| 6,057,053 A * | 5/2000 | Gibb | 429/37 |

FOREIGN PATENT DOCUMENTS

| | | | |
|---|---|---|---|
| DE | 195 23 637 A1 | 7/1996 | C23F/15/00 |
| DE | 198 05 674 C1 | 9/1999 | H01M/8/02 |
| EP | 0 052 986 A1 | 6/1982 | C25B/11/10 |
| EP | 0 107 934 A2 | 5/1984 | C23F/13/00 |
| EP | 0 129 374 | 12/1984 | C25B/11/08 |
| EP | 0 410 166 A1 | 1/1991 | H01M/8/02 |
| EP | 0 423 448 A1 | 4/1991 | H01M/8/02 |
| EP | 0 479 423 A1 | 4/1992 | C25B/11/04 |
| EP | 0 546 714 A1 | 6/1993 | C25B/11/04 |
| JP | 04 12456 A | 1/1992 | |

(List continued on next page.)

OTHER PUBLICATIONS

Greef et al, "Instrumental Methods in Electrochemistry", Chapman & Hall, 1990, no month.
Pletcher et al, "Industrial Electrochemistry", Chapman Y Hall, 1990, p 38, no month.
Chemical Abstracts, vol. 126, No. 19, May, 1997, Abstract No. 253329.

*Primary Examiner*—Stephen J. Kalafut
(74) *Attorney, Agent, or Firm*—Mayer Brown Rowe & Maw LLP

(57) ABSTRACT

A plate, e.g. a bipolar plate, for fuel cells for (a) conducting current from the anode of one cell unit to the cathode of the adjacent cell unit and/or (b) distributing fluid which comprises a substrate with a coating of an electrocatalytically-active material comprising ruthenium oxide.

62 Claims, 1 Drawing Sheet

FOREIGN PATENT DOCUMENTS

Figure 1:
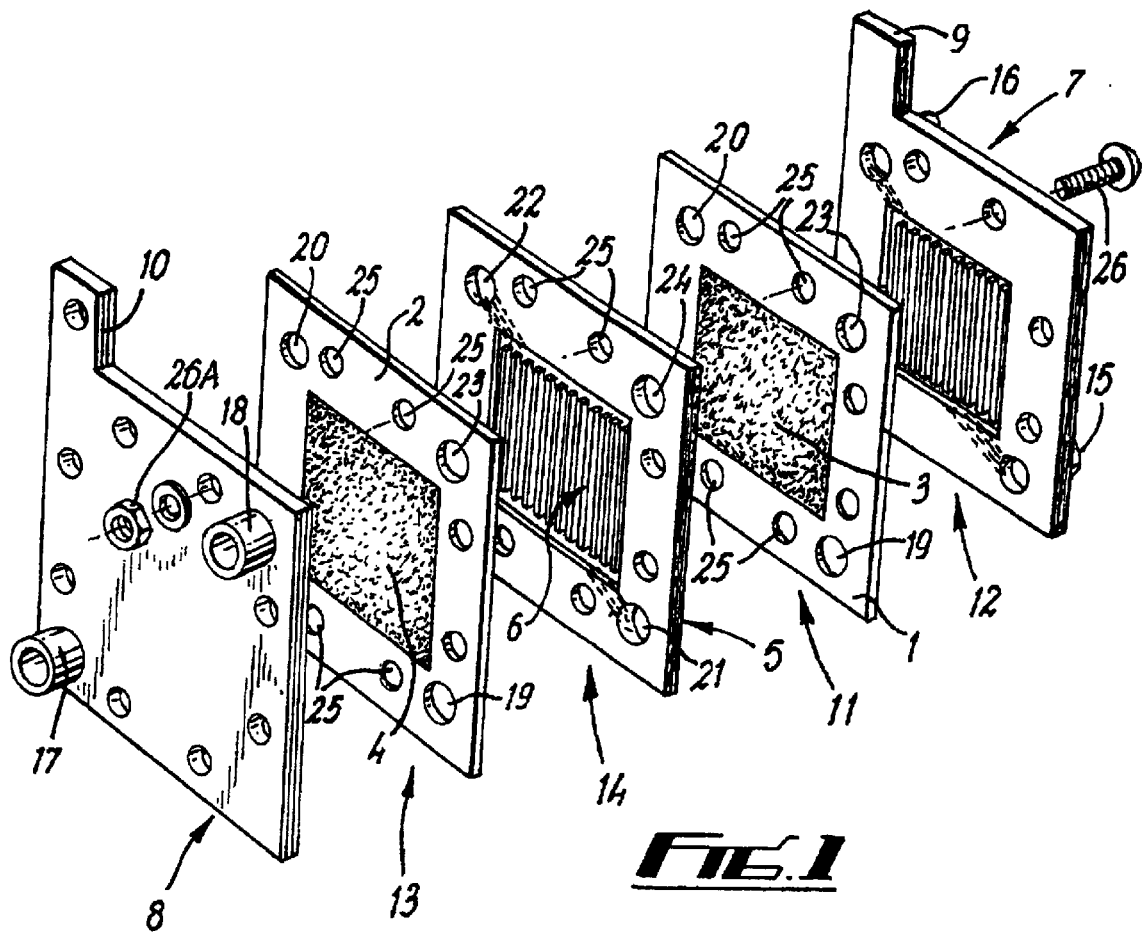

| | | | | |
|---|---|---|---|---|
| JP | 04 12457 A | 1/1992 | | |
| JP | 08 045530 | 2/1996 | ............ | H01M/8/12 |
| JP | 09 245819 | 9/1997 | ............ | H01M/8/02 |
| JP | 10 241715 A | 9/1998 | | |
| JP | 11 126620 | 5/1999 | ............ | H01M/8/02 |
| JP | 11 162478 | 9/1999 | ............ | H01M/8/02 |
| WO | WO 95/05498 | 2/1995 | ........... | C25B/11/04 |
| WO | WO 95/05499 | 2/1995 | ........... | C25B/11/04 |
| WO | WO 95/16287 | 6/1995 | ........... | H01M/8/02 |
| WO | WO 96/24705 | 8/1996 | ........... | C25B/11/04 |

* cited by examiner

FUEL CELLS AND FUEL CELL PLATES

This is a Continuation of: International Appln. No. PCT/GB99/03206 filed Sep. 27, 1999 which designated the U.S., end that International Application was published under PCT Article 21(2) in English.

This application claims the benefit of U.S. Provisional Application No. 60/190,929, filed Mar. 27, 2000.

The present invention relates to plates for fuel cells, to fuel cells comprising such plates and particularly to so-called proton-exchange membrane fuel cells.

A fuel cell is an electrochemical device in which electricity is produced without combustion of fossil fuel.

In a fuel cell a fuel, which is typically hydrogen, is oxidised at a fuel electrode (anode) and oxygen, typically from air, is reduced at a cathode to produce an electric current and form by-product water. An electrolyte is required which is in contact with both electrodes and which may be alkaline or acidic, liquid or solid. Heat and water are the only by-products of the electrochemical reaction in fuel cells wherein the fuel is hydrogen. Accordingly, the use of such cells in power generation offers potential environmental benefits compared with power generation from combustion of fossil fuels or by nuclear activity.

In proton-exchange membrane fuel cells, hereinafter referred to for convenience as "PEM" fuel cells, the electrolyte is a solid polymer membrane which allows transport of protons from the anode to the cathode and is typically based on perfluorosulphonic acid materials. The electrolyte must be maintained in a hydrated form during operation in order to prevent loss of ionic conduction through the electrolyte.

A PEM fuel cell typically comprises two electrodes, an anode and a cathode, separated by a proton-exchange membrane electrolyte. At the anode, hydrogen fuel catalytically dissociates into free electrons and protons. The free electrons are conducted in the form of usable electric current through the external circuit with which the fuel cell is in electrical contact. The protons migrate through the membrane electrolyte to the cathode where they combine with oxygen from the air and electrons from the external circuit to form water and generate heat. Individual fuel cells may be combined into assemblies which are often referred to in the art as stacks to provide the amount of power required.

A PEM fuel cell assembly comprises a plurality of such individual cells. In a fuel cell assembly bipolar or separator plates, also known as fluid flow field plates, play a significant role. The bipolar or separator plate is fabricated with surface features, for example a series of corrugations or a serpentine pattern, which provide gas flow channels which ensure essentially even distribution of input gases over the electrode surfaces. The bipolar or separator plate should have high electrical conductivity as an ohmic loss in the plate will reduce the overall assembly efficiency.

Bipolar plates for fuel cells constructed from metals, referred to therein as bipolar terminal grids, have been described by Douglas et al in U.S. Pat. No. 3,134,696. Bipolar plates for fuel cells constructed from carbon/polymer composites, referred to therein as bipolar current collectors-separators, have been described by Lawrence in U.S. Pat. No. 4,214,969. Bipolar plates for fuel cells constructed from graphite, referred to therein as fluid flow field plates, have been described by Wilkinson et al in WO 95/16287. The disclosures in these patent specifications are incorporated herein by way of reference.

Fuel cells may include other forms of plates such as current collecting plates by means of which electrical current generated by the chemical reaction is collected for delivery to an external circuit.

We have now found that the electrical conductivity of plates for fuel cells can be increased by coating them with a coating of an electrocatalytically-active material.

In broad terms, the present invention is concerned with a plate, for use in a fuel cell assembly, for (a) conducting current and/or (b) distributing fluid, the plate comprising a substrate with a coating of an electrocatalytically-active material, preferably comprising ruthenium oxide.

By "electrocatalytically-active material" we mean a material which where used as an electrode or coating therefor catalyses electrochemical reactions at high current densities at potentials close to the equilibrium potential as is more fully described by R Greef et al in "Instrumental Methods in Electrochemistry", Ellis Horwood, 1990 and by D Pletcher et al in "Industrial Electrochemistry", Chapman and Hall, 1990.

The plate may comprise a bipolar or separator plate or it may comprise a current-collecting plate of the fuel cell.

The plate according to the present invention may be provided with surface features, for example an in-plane non-uniform structure, which may be regular or irregular, e.g. a series of corrugations or serpentine pattern, which provide gas flow channels which ensure essentially even distribution of fuel, e.g. input gases, over the electrode surfaces and facilitate transport of by-products, e.g. water, therefrom.

Such surface features may be formed by techniques well known to those skilled in the art, for example embossing or die-casting.

According to another aspect of the present invention there is provided a fuel cell comprising a) at least two bipolar or separator plates;
b) a membrane electrode assembly disposed between the plates, which membrane electrode assembly comprises a pair of opposed electrodes with a proton-exchange membrane disposed therebetween with the proviso that where the fuel cell comprises more than two plates a membrane electrode assembly and a plate alternate throughout the cell and the membrane electrode assemblies are disposed in the fuel cell such that an anode and a cathode alternate throughout the cell;
c) current-collecting means;
d) means to feed gaseous hydrogen fuel to the anodes; and
e) means to feed an oxygen-containing gas to the cathode;
characterised in that each bipolar or separator plate comprises a plate according to the first aspect of the present invention.

According to a third aspect of the present invention there is provided a fuel cell assembly comprising:

a) a plurality of cell units each of which contains a proton-exchange membrane separating the cell into anolyte and catholyte chambers and provided with an anode and a cathode on opposite sides thereof;
b) a bipolar or separator plate disposed between adjacent cell units;
c) current-collecting means;
d) means to feed hydrogen fuel to the anolyte chambers of the cell; and
e) means to feed an oxygen-containing gas to the catholyte chambers of the cell;
characterised in that each bipolar or separator plate comprises a plate according to the first aspect of the present invention.

The current-collecting means serve to provide a connection to an external circuit and are preferably terminal current-collector plates. The current collecting means may likewise comprise a plate according to the first aspect of the invention.

According to another aspect of the present invention there is provided a fuel cell stack comprising a plurality of individual fuel cell units located between a pair of current-collecting plates with bipolar or separator plates provided between adjacent fuel cell units, characterised in that at least one of said plates includes a substrate with a coating of an electrocatalytically-active material as herein defined, preferably comprising ruthenium oxide.

According to a further aspect of the present invention there is provided a fuel cell stack comprising a plurality of individual fuel cell units and end plates and/or current-collecting plates of the stack associated with the stack, characterised in that at least one of said plates includes a substrate with a coating of an electrocatalytically-active material as herein defined.

The end and/or current-collecting plates of the fuel cell stack may be provided with means for collecting current generated during operation of the stack, means for controlling fluid distribution within the interior of the stack, means for use in applying clamping forces to the stack and means for the supply and removal of fluids from the stack.

The substrate may be provided with fluid flow channels. For example, the end and/or current collecting plate(s) provided with such coating may be of a monolithic or unitary construction incorporating fluid flow channels as well as acting as a current collector.

Alternatively the end and/or current collecting plate(s) provided with such coating may be of a composite structure including said substrate and a further plate or sheet of material provided with fluid flow channels. For example, the end and/or current collecting plate may comprise substrate having no surface features from the standpoint of fluid flow within the stack and a separate layer of material provided with surface features for fluid flow, e.g. a graphitic material such as Grafoil which is available commercially from UCAR Carbon Company Inc of Cleveland, Ohio.

Where the end and/or current collecting plates are of composite construction including a separate layer provided with the fluid flow channels, only the substrate need be provided with said coating, although we do not exclude the possibility that the separate layer may also be coated with said electrocatalytically-active material.

The means for collecting current and/or the means for supply and removal of fluids may be coated with said electrocatalytically-active material at least in part. For example, each end and/or current collecting plate may be provided with fluid feed and withdrawal conduits connected thereto and the coating may penetrate into such conduits so that internal surfaces of such conduits are coated with said electrocatalytically-active material.

The stack may also include one or more separator plates located between successive fuel cell units of the stack and serving to conduct current from the anode of one cell unit to the cathode of the adjacent cell unit and/or channel fluid flow associated with the fuel cell units, at least one of the separator plates including a substrate with a coating of an electrocatalytically-active material as herein defined.

The separator plate(s) provided with said coating may be of monolithic or composite structure as referred to above.

Typically the end and/or current collecting plates are of greater thickness than the separator plates; for example the separator plates may comprise a substrate having a thickness ranging from 0.5 to 2000 microns (e.g. 10 to 1000 microns and typically 20 to 750 microns, eg. 20 to 350 microns) whereas the the thickness of the thicker end and/or current collecting plates may be at least 0.3 mm, e.g. from 0.5 mm up to 10 mm or greater and typically from 1 mm up to 10 mm or greater.

The separator plates may comprise a metal substrate in the form of a metal foil, e.g. a titanium, titanium alloy, aluminium, aluminium alloy or stainless steel foil, e.g with a thickness of 500 microns or less.

The end and/or current collecting plates may each provided with at least one stack-supporting projection for contact with a surface on which the fuel cell is to be stood whereby the fuel cell units and separator plates are supported through the end and/or current collecting plates in spaced relation above the support surface. The projection or projections may be constituted at least in part by an end and/or current collecting plate portion or portions extending beyond the outer peripheries of the fuel cell units and separator plates. Whilst not strictly necessary, the projections of the end and/or current collecting plates may also be coated with said coating of an electrocatalytically-active material as herein defined so as to avoid having to selectively coat the end and/or current collecting plates. Thus, for example, each end and/or current collecting plate may have a greater areal extent than the cross-sectional area of the fuel cell units of the stack and that face of the end and/or current collecting plate which is exposed to the interior of the stack may be coated over its entire surface including those regions thereof which are not exposed to the stack interior, such regions being associated with said support projections and/or projections (e.g. tabs) for connection to current collection means.

Preferably the fuel cell stack includes cooling means for removal of heat generated during operation since proton-exchange membranes tend to be sensitive to high temperatures. Thus, at least some of separator plates within the stack may be provided with coolant-conducting passageways for the passage of gaseous or liquid coolant (e.g. air or water). Each separator plate may be provided with such coolant-conducting passageways but, often, only every nth plate is so equipped (where n is typically 3 or 4). Alternatively coolant may be brought into heat exchange relation with the interior of the fuel cell stack by means of separate cooling sections located at one or more points within the stack structure or by means of a coolant jacket or jackets (using water as the coolant for example). Examples of cooling of fuel cell stacks are disclosed for instance in WO-A-95/16287 (Ballard).

The fuel stack preferably also incorporates sealing gaskets interleaved between adjacent end and/or current collecting plates and other components of the fuel cell stack so as to seal the active interior of the fuel cell stack.

The invention may be said to reside in the recognition that the electrical conductivity of the end and/or current collecting plates and optionally the separator plates of a fuel cell stack can be increased by providing them with a coating of an electrocatalytically-active material. The electrocatalytically active coating may also serve to impart corrosion resistance to the plate(s).

Thus by providing said coating on the end and/or current collecting plate(s), and optionally also the separator plate(s), high electrical conductivity and hence high operational fuel cell efficiency can be achieved at relatively low cost. In this context, fuel cell stack end plates are conventionally fabricated from stainless steel carrying a gold-plated layer to secure good conductivity, it being usually necessary to provide an intermediate layer of for example nickel between the stainless steel substrate and the gold layer in order to secure good bonding of the gold to the end plate. Apart from the expense of providing the stainless steel with a gold-plated layer, the use of nickel is undesirable especially in the case of PEM fuel cells because nickel is a poison for the membrane materials commonly in use.

The fluid flow channels associated with the end and/or current-collecting plate(s) and/or separator plate(s) typically comprise surface features, for example an in-plane non-uniform structure, which may be regular or irregular, e.g. a series of corrugations or a serpentine pattern, to afford gas flow channels which ensure essentially even distribution of fuel, e.g. input gases, over the electrode surfaces and facilitate transport of by-products, e.g. water, therefrom.

Such surface features may be formed by techniques well known to those skilled in the art, for example embossing, etching or die-casting.

The anode and cathode in the fuel cell according to the present invention may be discrete components but may be provided as integral parts of a single unit as is more fully described in WO 95/16287.

In the fuel cell assembly or stack according to the present invention the plurality of cell units may be connected in bipolar or monopolar configuration as is more fully described by Kordesch and Simader in "Fuel Cells and their Applications". VCH. 1996 at 49–50, the description in which is incorporated herein by way of reference.

Whereas both the fuel cell assembly according to the present invention and the plate according to the present invention are typically planar we do not exclude the possibility that they may be cylindrical or tubular.

We do not exclude the possibility that the fuel cell, the fuel cell assembly and the plate according to the present invention may be embodied in liquid electrolyte fuel cells such as phosphoric acid and so-called "direct methanol" fuel cells.

The electrocatalytically-active coating applied to the plate according to the present invention is typically derived from a metal, metal oxide or mixtures thereof from Group 8 of the Periodic Table of Elements, namely Fe, Co, Ni, Ru, Rh, Pd, Os, Ir and Pt.

Suitable electrocatalytically-active coatings comprising mixtures of platinum group metal and platinum group metal oxide are described in our EP-A-0129374.

Suitable electrocatalytically-active coatings comprising mixtures of ruthenium oxide, non-noble metal oxide and noble metal or oxide thereof are described in our EP-A-0479423.

Suitable electrocatalytically-active coatings comprising mixtures of cerium oxide and at least one non-noble Group 8 metal are described in our EP-A-0546714.

The electrocatalytically-active coating is preferably ruthenium oxide or mixtures of ruthenium oxide with at least one of PtO, $Sb_2O_3$, $Ta_2O_5$, PdO, $CeO_2$, $Co_3O_4$ or preferably a mixture of $RuO_2$ with at least one of $TiO_2$, $SnO_2$ and $IrO_2$.

Where the electrocatalytically-active coating comprises a mixture of ruthenium oxide and another oxide the content of the ruthenium oxide may be in the range 0–100 mol %, e.g. 0.05–90 mol %, and typically 5–90 mol %.

The thickness of the electrocatalytically-active coating on the plate may be in the range 0.5–400 gm-2, and typically 1–90 gm-2.

We do not exclude the possibility that the electrocatalytically-active coating may comprise an intermediate layer between the substrate and the outer layer. As examples of such intermediate layers may be mentioned inter alia the heat-treated niobium oxide layer and the tantalum layer described in EP-A-052986 and EP-A-0107934 respectively.

Where the coating comprises ruthenium oxide it may comprise a plurality of different layers, for example a layer of $RuO_2/TiO_2$ and a layer of $RuO_2/SnO_2$.

The substrate of which the bipolar electrode is comprised is typically a metal chosen from Ti, V, Cr, Mn, Fe, Co, Ni, Cu, Zr, Nb, Ag, Pt, Ta, Pb, Al, or alloys thereof, preferably titanium or stainless steel or aluminium (or alloys thereof). However, we do not exclude the possibility that the substrate may be formed from a non-metallic material, for example graphite, carbon-fibre paper, carbon-fibre cloth, Ebonex (RTM), or an organic polymeric material, e.g. carbon-filled polypropylene.

The electrocatalytically-active coatings may be applied to the substrate by, for example, painting (e.g. by brushing or electrostatic spraying) of a solution of precursors followed by thermal decomposition, thermal spraying, screen-printing of metal alloy, Physical Vapour Deposition (PVD), Chemical Vapour Deposition (CVD), electroplating, electroless plating or spray pyrolysis.

Application of an electrocatalytically-active coating comprising an outer layer of ruthenium oxide and non-noble metal oxide to a substrate by PVD is more fully described in our WO 95/05499.

Application of an electrocatalytically-active coating comprising an outer layer of ruthenium oxide and non-noble metal oxide to a substrate by thermal spraying is more fully described in our WO 95/05498.

Application of an electrocatalytically-active coating comprising an outer layer of (a) cerium and/or cerium oxide and at least one non-noble Group 8 metal or (b) platinum and/or platinum oxide and ruthenium and/or ruthenium oxide by PVD is more fully described in our WO 96/24705.

We do not exclude the possibility that different coatings may be applied to different surfaces, e.g oppositely facing surfaces, of the substrate especially in the case of the separator plates.

The surfaces to be coated may be quite complex, e.g. it may be desirable for the coating to be applied to internal surfaces within pipework connected to the end plates, particularly pipework for conducting fluids to and/or from the stack. The coating technique employed may therefore be selected with regard to the nature, particularly the topology, of the surface area to be coated. For complex topologies, coating by immersion techniques may be preferable to those involving "line of sight" application.

Hydrogen fuel for use in the fuel cell assembly according to the present invention may be obtained from, for example, natural gas or methanol. Oxygen for use in the fuel cell assembly according to the further aspect of the present invention may be obtained from air.

It will be appreciated that in the fuel cell assembly according to the present invention the components thereof may be provided with aligned ports, e.g. slots, to form a manifold to allow flow of fuel gas and oxidant gas from the means to feed such gases to the cell to the anodes and cathodes respectively.

Figure 2:
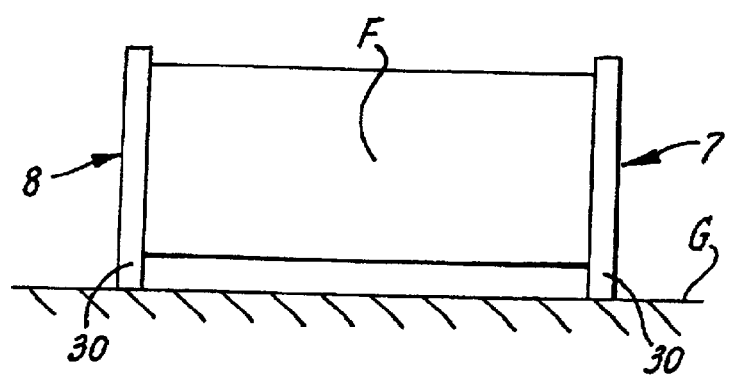

The present invention will now be described further by way of example only with reference to the accompanying drawing, in which:

FIG. 1 is an exploded perspective view of a fuel cell stack of the ion exchange membrane type with only a limited number of cell units illustrated for simplicity; and FIG. 2 is a diagrammatic view of the fuel cell stack showing the provision of supporting projections on the end plates.

Referring to FIG. 1, ion-permeable membranes 1 and 2 have cathode electrodes 3 and 4 respectively and anode electrodes (not shown), bonded to each of their major surfaces. Each membrane 1, 2 and its associated anode and cathode forms a fuel cell unit. A bipolar separator plate 5, provided with surface features 6, is disposed between ion-permeable membranes 1 and 2 in contact with the electrode surfaces thereof. Terminal plates 7 and 8, provided with tabs 9 and 10 for connection to for delivering electric current generated in the cell stack to an external circuit, are disposed adjacent membranes 1 and 2 respectively. In the illustrated embodiment, only one bipolar separator plate 5 is shown. In practice, there will usually be a plurality of bipolar separator plates each associated with adjacent pairs of fuel cell units.

In the stack, membrane 1 is held firmly between terminal plate 7 and bipolar plate 5 so as to from an oxidant gas chamber 11 and a fuel gas chamber 12. In like manner, membrane 2 is held firmly between terminal plate 8 and bipolar plate 5 so as to from an oxidant gas chamber 13 and a fuel gas chamber 14.

Hydrogen fuel is supplied to the anodes in the fuel gas chambers 12 and 14 via fuel gas inlet conduit 15 and by-products removed via conduit 16. Oxidant gas is supplied to cathodes 3 and 4 in the oxidant gas chambers 11 and 13 via oxidant gas inlet conduit 17 and by-products removed via conduit 18. Openings 19 and 20 located in opposite corners of membranes 1 and 2 are aligned with hydrogen gas inlet and outlet conduits 15 and 16 and with openings 21 and 22 in bipolar plate 5 to facilitate passage of hydrogen fuel gas into the fuel chambers 12 and 14 and to remove by-products therefrom.

Openings, not shown, and openings 23 located in opposite corners of membranes 1 and 2 are aligned with oxidant inlet and outlet conduits 17 and 18 and with opening 24 and another not shown in bipolar plate 5 to facilitate passage of oxidant gas into the oxidant chambers 11 and 13 and to remove by-products therefrom.

End plates 7 and 8, membranes 1 and 2 and bipolar plate 5 are each provided with a plurality of openings 25 through which assembly tie-rods 26 (one only of which is illustrated in part) pass and engage with nuts 26A so that the fuel cell units and bipolar separator plates are clamped between the end plates 7 and 8. Though not illustrated, sealing gaskets will be interleaved with the membrane carrying plates 1 and 2, the bipolar plates 5 and the end plates 7 and 8 to seal the active interior of the fuel cell stack.

The end plates 7, 8 and the bipolar plate 5 all carry a coating of electrocatalytically active material as defined herein in order to enhance conductivity and, in some cases, depending on the nature of the electrolyte for instance may impart corrosion resistance properties to the plates. The coating may also be applied to the internal surfaces of the conduits and also to the tabs 9 and 10. Such coating may be effected during the coating of the end or terminal plates 7, 8. In the case of the end plates 7, 8 only those faces which are presented towards the interior of the fuel cell stack need be coated in practice. However, for simplicity of coating, the entire face of the end plate may be so coated, including the borders which are not actually exposed to the interior of the fuel cell stack during operation.

Although not shown, the stack is desirably provided with cooling means for dissipating at least part of the heat generated during operation. Such cooling means may be implemented by adapting one or more of the separator plates or inclusion of suitable elements within the stack so as to incorporate coolant passageways which are in heat exchange relation with the active interior of the fuel cell stack and through which a coolant fluid such as water or air can be passed, the interiors of the fluid coolant passageways being isolated from the interior of the fuel cell stack.

As shown in FIG. 2, the end plates 7 and 8 are of greater cross-sectional area than the remaining plates forming the fuel cell stack F so as to provide a projection or projections 30 (which may be integral with the substrate material of the end plates) for engagement with a surface G on which the fuel cell stack is supported in use. If desired, the supporting projections 30 may also carry a coating of electrocatalytically active material as defined herein so as to simplify the coating process by eliminating the need to effect selective coating of the end plates.

In the illustrated embodiment, the end plates 7, 8 per se are used as part of the means to apply compression to the stack; in a modified embodiment, the current collecting end plates and other plates forming the fuel cell stack may be located inboard of separate compression-applying plates, for example as shown in U.S. Pat. No. 5,840,438 (assignee: Ballard). In this event, the separate compression-applying plates rather than the current collecting plates may be provided with supporting projections as referred to above. Also as disclosed in U.S. Pat. No. 5,840,438, the fuel cell stack may include a humidifying section between the fuel cell units and one of the end plates (or one of the compression-applying plates when present) for the introduction of water vapour into the fuel and oxidant streams fed to the stack.

In a further embodiment of the present invention, a layer of diffusion material which is electrically conducting and porous, for example a carbon-coated paper or a graphite-impregnated polymer film, is disposed in the oxidant gas chambers 11 and 13 and/or in the fuel gas chambers 12 and 14. For example, the layer of diffusion material may be disposed between bipolar plate 5 and the adjacent electrode surfaces of membranes 1 and 2 and/or between the terminal plates 7 and 8 and the adjacent electrode surfaces of membranes 1 and 2.

The present invention is further illustrated by reference to the following Examples.

EXAMPLES 1 AND 2

These Examples illustrate plates and fuel cells according to the present invention wherein the coating of electrocatalytically-active material comprises ruthenium oxide and titanium oxide. A coating of composition 47.5 mole % ruthenium and 52.4 mole % titanium was prepared by adding tetra-n-butyl titanate (7.47 g) to a solution of ruthenium (2 g), as ruthenium trichloride, in pentan-1-ol (31 g).

In Example 1, a portion of this solution was applied by brush to a titanium substrate which had been etched in 10% oxalic acid solution at 80–85° C. for 8 hours. The coated substrate was dried at 180° C. and then baked at 450° C.; 12 coats were applied in this manner. Three of the coated plates were operated as bipolar plates in a PEM fuel cell and the cell voltage output thereof was determined at 1 A/cm$^2$ and the percentage voltage efficiency calculated therefrom.

In Example 2, the procedure of Example 1 was repeated except that the substrate was a 316 L stainless steel plate which had been grit blasted.

In a Comparative Test, 316 L stainless steel plates were operated as bipolar plates in a PEM fuel cell. The results are shown in the Table below from which it can be seen that PEM fuel cells according to the present invention have a voltage efficiency at least 13% better than a PEM fuel cell comprising a known plate.

TABLE

| Bipolar plate material | Voltage efficiency % |
|---|---|
| 316L stainless steel | 100 (comparative) |
| Example 1 | 113 |
| Example 2 | 117 |

EXAMPLE 3

This example illustrates plates, such as bipolar plates, according to the present invention wherein the coating of electrocatalytically-active material comprises a nickel/cobalt spinel. $Co(NO_3)_2.6H_2O$ and $Ni(NO_3)_2.6H_2O$ were dissolved in pentan-1-ol to give a total solute concentration of 0.4M and a Co:Ni ratio of 2:1. Five coats of this solution were applied by brush to an etched titanium substrate, each coat being dried for 10 mins. at 180° C. After addition of the last coat the plate was annealed at 350° C. for 10 hours. The loading of coating, a mixed cobalt/nickel oxide on the substrate, was 2.5 g/m2.

EXAMPLES 4–6

These Examples illustrate plates, such as bipolar plates, according to the present invention wherein the coating of electrocatalytically-active material comprises ruthenium oxide and tin oxide (Examples 4 and 5) and ruthenium oxide, tin oxide and iridium oxide (Example 6). In these Examples the coating was applied to a stainless steel (SS) substrate by physical vapour deposition (PVD) which is more fully described in our WO 96/24705, the disclosure in which is incorporated herein by way of reference. The SS substrates were degreased ultrasonically in Arklone (RTM) and then:

Example 4—the stainless steel substrate was not subjected to any further pre-treatment;

Example 5—the stainless steel substrate was pre-treated by grit blasting and etching in 10% oxalic acid solution by making cathodic for up to 10 mins. at 4–5 volts; and Example 6—the stainless steel substrate was pre-treated by etching in 10% oxalic acid solution by making cathodic for up to 10 mins. at 4–5 volts.

The coatings were applied to the substrates using a Ru/Sn source (Examples 4 and 5) or a Ru/Sn/Ir source as described in our WO 96/24705. The loading of coating on the substrate was 35 $g/m^2$.

EXAMPLE 7

This Example illustrates a plate, e.g. a bipolar plate, according to the present invention wherein the coating of electrocatalytically-active material comprises cerium oxide. A titanium substrate was etched and the coating was applied thereto by plasma spraying a cerium/nickel powder as is more fully described in our EP-A-0546714, the disclosure in which is incorporated herein by way of reference. The loading of coating on the substrate was 380 $g/m^2$.

EXAMPLE 8

This Example illustrates plates, such as bipolar plates, according to the present invention wherein the coating of electrocatalytically-active material comprises ruthenium and tin. An etched titanium plate and a platinum electrode were immersed in a solution of ruthenium trichloride (58 g) and stannous trichloride (205 g) in 6M hydrochloric acid (1000 ml). With the titanium plate as cathode an electric current was applied to the solution, equivalent to 0.5 $kA/m^2$ for 30 mins. The loading of the Ru/Sn coating on the titanium substrate was 1.5 $g/m^2$.

EXAMPLES 9–10

These Examples illustrate plates, such as bipolar plates, according to the present invention wherein the coating of electrocatalytically-active material comprises ruthenium oxide and platinum oxide. In Example 9, the substrate was a titanium plate. In Example 10, the substrate was a stainless steel plate.

Five coats of a solution of $RuCl_3$ (7.4 g) and $H_2PtCl_6$ (22.2 g) in a mixture of acetic acid (100 ml) and hydrochloric acid (900 ml) were applied by brush to the substrates. Each coat was dried at 180° C. for 10 mins and then fired at 450° C. for 20 mins. After the final coat had been fired the bipolar plate was heated in air for 1 hour at 450° C. The loading of platinum on the substrates was 1.5 $g/m^2$.

EXAMPLES 11–12

These Examples illustrate plates, such as bipolar plates, according to the present invention wherein the substrates are non-metallic. In these Examples, the substrate was Ebonex (RTM). The substrates were cleaned ultrasonically in IPA, air dried and heated at 180° C. for 10 mins.

In Example 11 the electrocatalytically-active coating comprised platinum oxide and iridium oxide in weight ratio 70:30 and the loading of the coating was 1.5 $g/m^2$. The coating was prepared by applying six coats of a solution of $H_2IrCl_6$ (11.9 g) and $H_2PtCl_6$ (32.6 g) in pentanol (1000 mnl) by brush to the substrates. Each coat was dried at 180° C. for 10 mins and then fired at 500° C. for 20 mins. After the final coat had been fired the bipolar plate was heated in air for 1 hour at 450° C.

In Example 12 the electrocatalytically-active coating comprised ruthenium oxide and titanium oxide in weight ratio 35:65 and the loading of the coating was 20 g/m2. The coating was prepared as described in Examples 1–2 except that 6 coats of the solution were applied instead of 5 coats.

Whilst endeavouring in the foregoing specification to draw attention to those features of the invention believed to be of particular importance, it should be understood that the Applicant claims protection in respect of any patentable feature or combination of features disclosed herein and/or shown in the drawings whether or not particular emphasis has been placed on such feature or features.

It will be appreciated that certain features of the invention which are, for clarity, described in the context of separate embodiments, may also be provided in combination in a single embodiment. Conversely, various features of the invention which are, for brevity, described in the context of a single embodiment may also be provided separately or in any suitable sub-combination.

What is claimed is:

1. A fuel cell assembly including at least one plate for (a) conducting current and/or (b) distributing fluid, the plate comprising a metallic substrate with a coating of an electrocatalytically-active material comprising ruthenium oxide.

2. The fuel cell assembly of claim 1, wherein the plate is a terminal plate.

3. The fuel cell assembly of claim 1 in which the plate is an intermediate separator plate operable in use to conduct current from the anode of one fuel cell unit to the cathode of the adjacent fuel cell unit and/or distribute fluid flow in the fuel cell assembly.

4. The fuel cell assembly of claim 1, being a phosphoric acid fuel cell.

5. A PEM, phosphoric acid or direct methanol fuel cell assembly, for (a) conducting current and/or (B) distributing fluid, comprising at least one plate comprising a metallic substrate with a coating of an electrocatalytically-active material comprising a mixture of ruthenium or an oxide thereof, and a metal or oxide of a metal selected from the group comprising Sn, Fe, Co, Ni or Os.

6. A fuel cell assembly including at least one bipolar or separator plate for disposition between adjacent fuel cell units for (a) conducting current and/or (b) distributing fluid, said at least one plate comprising a metallic substrate with a coating of an electrocatalytically-active material comprising ruthenium oxide.

7. The fuel cell assembly of claim 6 in which the electrocatalytically-active material further comprises, in addition to ruthenium oxide, at least one other metal oxide.

8. The fuel cell assembly of claim 6 in which the electrocatalytically-active material further comprises, in addition to ruthenium oxide, at least one metal or metal oxide from Group 8 of the Periodic Table of Elements.

9. The fuel cell assembly of claim 6 in which the electroactively-active material further comprises, in addition to ruthenium oxide, at least one of PtO, $Sb_2O_3$, $Ta_2O_5$, PdO, $CeO_2$, $Co_3O_4$, $TiO_2$, $SnO_2$ and $IrO_2$.

10. The fuel cell assembly of claim 6 in which the electroactively-active material further comprises, in addition to ruthenium oxide, $TiO_2$.

11. The fuel cell assembly of claim 6 in which the electroactively-active material further comprises, in addition to ruthenium oxide, $SnO_2$.

12. The fuel cell assembly of claim 6 in which the electroactively-active material further comprises, in addition to ruthenium oxide, $IrO_2$.

13. The fuel cell assembly of claim 6, the plate having a fluid inlet aperture and a fluid outlet aperture and bring provided with surface features forming channels for conducting fluid flow from the inlet aperture to the outlet aperture.

14. The fuel cell assembly of claim 13 in which the inlet and outlet apertures are located at opposite sides of the plate and the surface features are located in the region of the plate extending between the inlet and outlet apertures.

15. The fuel cell assembly of claim 13 in which the surface features comprise a series of corrugations or a serpentine pattern.

16. The fuel cell assembly of claim 13, the surface features being embossed, etched, engraved, moulded, stamped, or die cast.

17. The fuel cell assembly of claim 13 in which the plate has a further fluid inlet aperture and a further fluid outlet aperture and is provided on its opposite face with surface features forming channels for conducting fluid flow from the further inlet aperture to the further outlet aperture.

18. The fuel cell assembly of claim 13 in which the inlet and outlet apertures are located at opposite sides of the plate.

19. The fuel cell assembly of claim 18 including surface features located in the region of the plate extending between the inlet and outlet apertures.

20. The fuel cell assembly of claim 6 in which the substrate is a metal selected from Ti, V, Cr, Mn, Fe, Co, Ni, Cu, Zr, Nb, Ag, Pt, Ta, Pb, Al or alloys thereof.

21. The fuel cell assembly of claim 6, the substrate of the plate being of aluminum or an alloy thereof.

22. The fuel cell assembly of claim 6, the substrate of the plate being of titanium or an alloy thereof.

23. The fuel cell assembly of claim 6, the substrate of the plate being of iron or an alloy thereof.

24. The fuel cell assembly of claim 6 in which the substrate is of monolithic structure.

25. The fuel cell assembly of claim 6 in which the substrate is of composite structure.

26. The fuel cell assembly of claim 6 wherein said at least one plate includes fittings for connection to an external electrical circuit to which energy generated by the assembly is to be supplied.

27. The fuel cell assembly of claim 6 including pipework for conducting fluids to and/or from the assembly.

28. The fuel cell assembly of claim 27 in which the internal surfaces of the pipework are at least in part coated with said coating.

29. The fuel cell assembly of claim 6, being a PEM, phosphoric acid or direct methanol fuel cell.

30. The fuel cell assembly of claim 6 including separator plates and end and/or current-collecting plates, and is in which only the end and/or current-collecting plates of the assembly are provided with said coating.

31. The fuel cell assembly of claim 6 including separator plates and end and/or current-collecting plates, and is in which the end and/or current-carrying plates and only some of the separator plates are provided with said coating.

32. A plate, for use in a fuel cell assembly, for (a) conducting current and/or (b) distributing fluid, the plate comprising a substrate with a coating of an electrocatalytically-active material comprising a nickel/cobalt spinel, wherein said substrate comprises at least one metal selected from Ti, V, Cr, Mn, Fe, Co, Ni, Cu, Zr, Nb, Ag, Pt, Ta, Pb, Al or alloys thereof.

33. A fuel cell assembly comprising a plurality of individual fuel cell units each comprising an anode, a cathode and ion exchange membrane disposed between the anode and the cathode, a plurality of bipolar or separator plates located between the anode of one unit and the cathode of an adjacent unit, and end and/or current-collecting plates associated with the assembly, wherein at least one of the end and/or current-collecting plates and/or at least one of the bipolar or separator plates comprises a metallic substrate provided with a coating of an electrocatalytically-active material comprising ruthenium oxide or a mixture of ruthenium or oxide thereof, and a metal or oxide of a metal selected from Sn, Fe, Co, Ni or Os.

34. The fuel cell assembly of claim 33 including means for cooling the interior of the assembly.

35. The fuel cell assembly of claim 33 in which the end and/or current-collecting plates are provided with projections for engagement with a support surface to support the remainder of the assembly in spaced relation with the surface.

36. The fuel cell assembly of claim 33 in which the end and/or current-collecting plates comprise the primary means for the application of compression to the assembly.

37. The fuel cell assembly of claim 33 in which compression is applied to the end and/or current-collecting plates and to the remainder of the assembly by means of compression-applying plates located outboard of the end plates.

38. The fuel cell assembly of claim 33 in which the end and/or current-collecting plates are thicker than the separator plates.

39. The fuel cell assembly of claim 33 including humidifying means for introducing water vapour into the fuel and oxidant streams supplied to the assembly.

40. A fuel cell assembly as claimed in claim 33 in which said metallic substrate comprises a metal selected from the group comprising aluminum or an alloy thereof; titanium or an alloy thereof; iron or an alloy thereof; and stainless steel.

41. A fuel cell assembly comprising:
  a) a plurality of fuel cell units each of which contains a proton-exchange membrane separating the cell into anolyte and catholyte chambers and provided with an anode and a cathode on opposite sides thereof;
  b) a separator or bipolar plate disposed between adjacent cell units;
  c) end and/or current-collecting plates associated with the assembly;
  d) means for feeding hydrogen fuel to the anolyte chambers of the assembly; and
  e) means for feeding an oxygen-containing gas to the catholyte chambers of the assembly;
  wherein at least one end and/or current-collecting plate and/or at least one separator plate or bipolar plate comprises a metallic substrate provided with a coating of an electrocatalytically-active material comprising ruthenium oxide or a mixture of ruthenium or oxide thereof, and a metal or oxide of a metal selected from Sn, Fe, Co, Ni or Os.

42. A plate, for use in a fuel cell assembly, for (a) conducting current and/or (b) distributing fluid, the plate comprising a stainless steel substrate with a coating of an electrocatalytically-active material that comprises ruthenium oxide and an oxide selected from the group comprising $TiO_2$, $SnO_2$ and $IrO_2$.

43. A plate, for use in a fuel cell assembly, (a) conducting current and/or (b) distributing fluid, the plate comprising a substrate with a coating of an electrocatalytically-active material comprising a nickel/cobalt spinel, the substrate comprising a metal selected from the group comprising Ti, Fe, Al, and alloys thereof.

44. A fuel cell assembly including at least one end plate and/or current-collecting plate for (a) conducting current and/or (b) distributing fluid, said at least one plate comprising a metallic substrate with a coating of an electrocatalytically-active material comprising ruthenium oxide.

45. The fuel cell assembly of claim 44 in which the electrocatalytically-active material further comprises, in addition to ruthenium oxide, at least one other metal oxide.

46. The fuel cell assembly of claim 44 in which the electrocatalytically-active material further comprises, in addition to ruthenium oxide, at least one metal or metal oxide from Group 8 of the Periodic Table of Elements.

47. The fuel cell assembly of claim 44 in which the electroactively-active material further comprises, in addition to ruthenium oxide, at least one of PtO, $Sb_2O_3$, $Ta_2O_5$, PdO, $CeO_2$, $Co_3O_4$, $TiO_2$, $SnO_2$ and $IrO_2$.

48. The fuel cell assembly of claim 44 in which the electroactively-active material further comprises, in addition to ruthenium oxide, $TiO_2$.

49. The fuel cell assembly of claim 44 in which the electroactively-active material further comprises, in addition to ruthenium oxide, $SnO_2$.

50. The fuel cell assembly of claim 44 in which the electroactively-active material further comprises, in addition to ruthenium oxide, $IrO_2$.

51. The fuel cell assembly of claim 44, the plate having a fluid inlet aperture and a fluid outlet aperture and bring provided with surface features forming channels for conducting fluid flow from the inlet aperture to the outlet aperture.

52. The fuel cell assembly of claim 44 in which the substrate is a metal selected from Ti, V, Cr, Mn, Fe, Co, Ni, Cu, Zr, Nb, Ag, Pt, Ta, Pb, Al or alloys thereof.

53. The fuel cell assembly of claim 44, the substrate of the plate being of aluminum or an alloy thereof.

54. The fuel cell assembly of claim 44, the substrate of the plate being of titanium or an alloy thereof.

55. The fuel cell assembly of claim 44, the substrate of the plate being of iron or an alloy thereof.

56. The fuel cell assembly of claim 44 in which the substrate is of monolithic structure.

57. The fuel cell assembly of claim 44 in which the substrate is of composite structure.

58. The fuel cell assembly of claim 44 wherein said at least one plate includes fittings for connection to an external electrical circuit to which energy generated by the assembly is to be supplied.

59. The fuel cell assembly of claim 44 including pipework for conducting fluids to and/or from the assembly.

60. The fuel cell assembly of claim 44, being a PEM, phosphoric acid or direct methanol fuel cell.

61. The fuel cell assembly of claim 44 including separator plates and end and/or current-collecting plates, and in which only the end and/or current-collecting plates of the assembly are provided with said coating.

62. The fuel cell assembly of claim 44 including separator plates and end and/or current-collecting plates, and in which the end and/or current-carrying plates and only some of the separator plates are provided with said coating.

* * * * *